April 5, 1938.  F. J. REUTER  2,113,528
WIND PRESSURE INDICATOR
Filed April 25, 1935
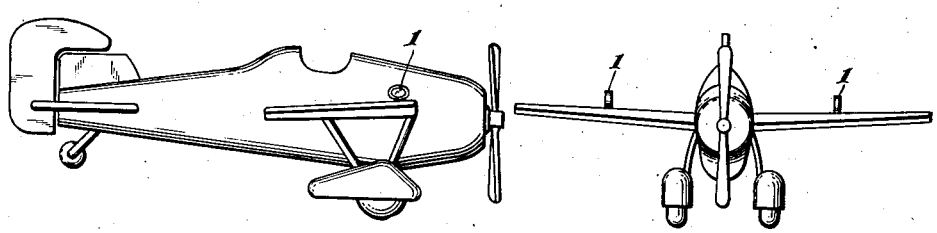
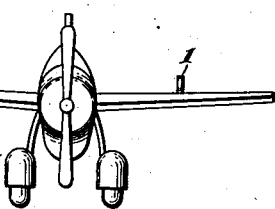
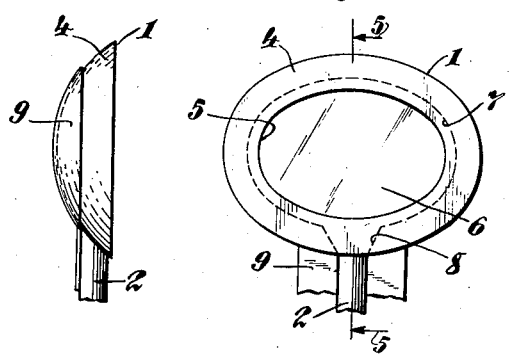
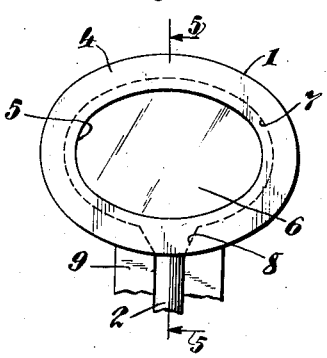
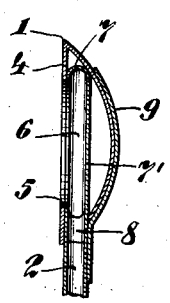
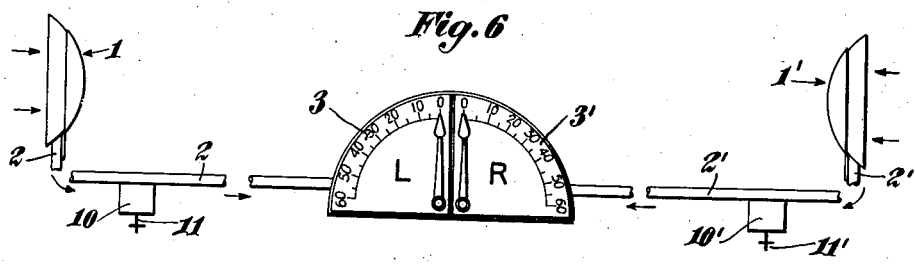
INVENTOR.
*Francis Jean Reuter*,
BY *Alexander Chessin*
HIS ATTORNEY.

Patented Apr. 5, 1938

2,113,528

UNITED STATES PATENT OFFICE 2,113,528

WIND PRESSURE INDICATOR

Francis Jean Reuter, Washington, D. C., assignor to Marguerite M. Reuter, Washington, D. C.

Application April 25, 1935, Serial No. 18,271

12 Claims. (Cl. 73—151)

The present invention relates to ship instruments and, more particularly, to instruments for indicating and measuring wind pressures tending to cause an aircraft to deviate from a predetermined course.

The main object of the invention is to indicate and measure the intensity of cross currents to which a ship is exposed and to gauge their effect on the course of the ship.

It is also an object of this invention to gauge this effect under conditions of invisibility, i. e. when meteorological conditions make it impossible to use land marks as references, or when no land marks are available, as in the case of a ship at sea, or of an aircraft flying over desert land or over a large body of water.

A further object of the invention is to provide the aforesaid indications without the need of any manipulative efforts on the part of the observer, who can, at any moment, ascertain the effect of any cross current on his ship by a mere glance at the indicator of the instrument. Nor is the pilot's attention distracted by the necessity of making observations outside his instrument board.

A still further object of the invention is to enable the pilot or observer to determine if the ship is encountering a head wind or a tail wind and to estimate the force of such wind, irrespectively of the condition of visibility.

The device will also assist an aviator, in times of hostility, while engaged in aerial bombing, to estimate the amount and direction of deviation to which a projectile will be subjected by the force of the wind in addition to the speed of the craft, the direction and force of the wind being determined or estimated as indicated in the two preceding paragraphs.

Further objects of the invention will become apparent from the specification which follows.

In the drawing, Figures 1 and 2 are, respectively, a side and a front elevation of an aeroplane showing the mounting of a receiver which forms a part of the present invention. The mounting, as shown, is mid-wing.

Figure 3 is a front view of a receiver such as is used in Figures 1 and 2. Figure 4 is a side elevation of this receiver, and Figure 5, a section along the line 5—5 of Figure 3.

Figure 6 is a diagram showing the connection between a pair of receivers, such as are shown in Figures 3-5, and their corresponding indicators.

Referring to the figures in detail, 1 is an element mounted on an aeroplane to receive air waves for transmission to an indicating instrument. The element 1 may be mounted at any suitable place on the ship, the choice being dictated by the condition that the location be as free as possible from disturbance by fouling currents, such as propeller wake or eddies. In Figure 2, the location selected is mid-wing. The instrument may be mounted at the wing tip. The preferred location is, generally, within these two points, forward of the center of gravity of the ship, on, or forward of, the main spar, or even ahead of the leading edge of the wing.

The element 1, herein above referred to as "receiver", comprises a casing 4, having an aperture 5; an inner body 6, having a back wall 7' with a circumferential groove 7 and a front aperture conforming to the aperture 5 of the casing 4; a funnel shaped outlet 8 into the pipe 2 leading to the indicating instrument 3 (Figure 6); and a bracket 9, within which rest the casing 4 and inner body 6. The element 1 is mounted on the aeroplane in such a manner that the open face of the casing 4 is at a right angle to the athwartship line of the craft. The indicating instrument 3, therefore, is not affected by the currents of air directly due to propulsion. The face of the casing 4 meets the back wall at a sharp angle, as is clearly shown in Figures 4 and 5. The receiver 1 is preferably elliptical or oval in shape, the greater one of its two axes being horizontal. In some cases, the circumferential groove 7 may be omitted from the design of the inner body 6, although the Pelton wheel bucket effect of this form of receiver generally increases the efficiency of the apparatus. If the horizontal width of the aperture in the face of the casing 4 be denoted by $a$, and the depth of the aperture by $d$, then I find that the best results are obtained by making the angle A in the formula $\tan A = d/2a$ about 5 degrees. The pipe 2 (Fig. 6) is provided with a water separator 10 and cock 11.

Figure 6 shows diagrammatically the right and left parts of the instrument, the corresponding elements of each part being denoted by the same numerals, those on the right being "primed". The indicator 3—3' may be of a conventional type and need not be described in detail here. A recording instrument may be substituted for, or added to, the indicator 3—3'.

The operation of the device will now be briefly explained.

The effect of wind on an aeroplane is to deflect the aeroplane from the position which it would be in if there had been no wind. This deflection is a function of the ratio of the mass of the aeroplane to the area of the projection of the aeroplane on a plane perpendicular to the direction of the wind. The smaller is this ratio, the greater will be the deflection. If any part of the aeroplane can move relatively thereto, and the ratio of the mass of this part to the area of its projection on a plane perpendicular to the direction of the wind, is less than the above ratio as applied to the entire aeroplane, then this part of the aeroplane will be deflected more than the aeroplane itself, i. e. this part of the aeroplane will be caused to move relatively thereto. In my instrument, the moving parts are in the indicator, which is fixed to the instrument board in the cockpit. The indicator is not described as it does not constitute any part of this invention. The moving parts have a negligible mass compared with the area affected by the pressure of the air admitted through the pipes 2, 2', so that these moving parts will be displaced relatively to the fixed part of the instrument and, therefore, relatively to the aircraft, causing a corresponding deflection of the indicator needle.

Owing to the adopted construction of the "receiver", it is affected only by the wind component athwartship, i. e. the component which causes the ship to drift at a right angle to its intended course. When a change occurs either from no wind to wind, or from wind in one direction to wind in a different direction, as, for example, in wind shift, the instrument will respond to such changes. These changes the pilot can observe at a glance on the instrument before him. A violent change will produce a great deflection. The indicator will gradually recede from the deflected position until there is no difference in the instrument's reception and the aircraft's drift. Such harmony is rare. However, the instrument is sensitive and acts in some ways like a Venturi tube having a comparatively large receiving aperture and a small leading tube. The result of the velocity through the leading tube is not used, as in the throat of a venturi, to reduce pressure, but to produce deflection at the instrument. The result is not produced at a distance from the indicating instrument and then transmitted mechanically or electrically. The effect is direct from receiver to indicator.

The differential effect of the air current is transmitted to the indicator directly by the pressure of air.

It will be noted that no manipulation of any kind on the part of the pilot or observer is required, nor is any observation beyond the instrument on the instrument board needed. The wind pressure is automatically indicated on the instrument and a glance at this instrument at once gives the pilot or observer the needed information.

In applying the present invention to the determination of whether the ship is encountering a head wind or a tail wind, and in estimating the force of such wind, irrespectively of the condition of visibility, the procedure is as follows: change course by 45°, stay on this course for about one minute, then change in opposite direction 90°, stay on this about one minute, finally change in opposite direction 45°, thus returning to the original course. During this maneuver, the pilot or observer notes which one of the indicators shows pressure. If the indicator registering pressure is opposite to the change of course direction (i. e., changing to right, left indicator registers; changing to left, right indicator registers), then a head wind is encountered. If changing course to right shows pressure registration on right indicator, and changing course to left, registration on left indicator, then a tail wind is encountered. If the ship should be in a drift synchronizing with an air current, and the pilot desires to check this, he may do so by changing his course three times, viz., off course 45°, off course 90° to first offset, and back to original course, and obtain an answer as to direction of the current by observing the wind pressure indicated on the instrument dial immediately after changing course.

Having described my invention in connection with an illustrative example thereof, it is to be understood that many variants are possible to those skilled in the art and that the illustrations herein are not to be taken as in any way limiting the invention to the example given or to the specific constructions shown.

I claim:

1. An aircraft instrument including a receiver responsive to cross currents only, a pressure responsive indicator, and means for transmitting air pressure from said receiver to said indicator, said receiver comprising a hollow body having a flat, apertured outer wall at a right angle to the athwartship axis of said aircraft, an inner back wall, and an inner concave peripheral wall connecting said back wall and said outer wall along the edge of its aperture.

2. An aircraft instrument including a receiver responsive to cross currents only, a pressure responsive indicator, and means for transmitting air pressure from said receiver to said indicator, said receiver comprising an outer casing having a flat, apertured outer surface at a right angle to the athwartship axis of said aircraft, and a hollow inner body within said casing having an aperture in registry with the aperture of said casing, a back wall, and a concave peripheral wall connecting said back wall to said casing along the edge of its aperture.

3. An aircraft instrument including a receiver responsive to cross currents only, a pressure responsive indicator, and means for transmitting air pressure from said receiver to said indicator, said receiver comprising a hollow body having a flat, apertured outer wall at a right angle to the athwartship axis of said aircraft, a flat inner back wall, and an inner concave peripheral wall connecting said back wall and said outer wall along the edge of its aperture.

4. An aircraft instrument including a receiver responsive to cross currents only, a pressure responsive indicator, and means for transmitting air pressure from said receiver to said indicator, said receiver comprising an outer casing having a flat, apertured facing at a right angle to the athwartship axis of said aircraft, and a hollow inner body within said casing having an aperture in registry with the aperture of said casing, a back wall having a surface parallel to said facing, and a concave peripheral inner wall connecting said back wall to said casing along the edge of its aperture.

5. In an aircraft instrument of the class described, a receiver comprising a hollow body having a flat, apertured front wall, an outer back wall forming a sharp edge with said front wall along its outer periphery, an inner back wall, and an inner concave peripheral wall connecting said inner back wall and said front wall along the edge of its inner periphery.

6. In an aircraft instrument of the class described, a receiver comprising an outer casing having a flat, apertured front facing and a back surface forming a sharp edge with said front facing along its outer periphery, and a hollow inner body within said casing, said inner body having an aperture in registry with the aperture of said casing, a back wall, and a concave peripheral wall connecting said back wall to said casing along the inner edge of said front facing.

7. In an aircraft instrument of the class described, a receiver comprising a hollow body having a flat, apertured outer facing, an inner back wall, and an inner concave peripheral wall of substantially semi-circular cross section connecting said back wall and said outer facing along the edge of its inner periphery.

8. In an aircraft instrument of the class described, a receiver comprising an outer casing having a flat, apertured outer facing, a hollow inner body within said casing having an aperture in registry with the aperture of said casing, a back wall on said inner body, and a concave peripheral inner wall of substantially semi-circular cross section connecting said back wall of the inner body and said facing along the edge of its inner periphery.

9. An aircraft instrument including a receiver responsive to cross currents only, said receiver comprising a hollow body having a flat, apertured outer wall at a right angle to the athwartship axis of said aircraft, an inner back wall, an inner concave peripheral wall connecting said back wall and said outer wall along the edge of its aperture, an outlet from said hollow body, a pressure responsive indicator, and conduit means from said outlet to said indicator.

10. An aircraft instrument including a receiver responsive to cross currents only, said receiver comprising an outer casing having a flat, apertured outer facing at a right angle to the athwartship axis of said aircraft, a hollow inner body within said casing having an aperture in registry with the aperture of said casing, a back wall on said inner body, a concave peripheral wall connecting said back wall and said casing along the edge of its aperture, a funnel shaped outlet from said peripheral wall, a pressure responsive indicator, and conduit means from said outlet to said indicator.

11. In an aircraft instrument of the class described, a receiver comprising a hollow body of shallow depth having a flat front facing provided with a central oval aperture, the longer axis of the oval being substantially parallel to the longitudinal axis of said aircraft, an inner back wall, and an inner concave peripheral wall connecting said inner back wall and said front facing along the periphery of said oval.

12. In an aircraft instrument of the class described, a receiver comprising a hollow body having a flat front facing provided with a central oval aperture, the depth of said hollow body having a ratio to twice the length of the longer axis of said oval equal approximately to the tangent of five degrees, an inner back wall, and an inner concave peripheral wall connecting said inner back wall and said front facing along the periphery of said oval.

FRANCIS JEAN REUTER.